United States Patent Office 3,267,177
Patented August 16, 1966

3,267,177
BORIC ACID ESTERS OF PHENOLS AS INHIBITORS FOR UNSATURATED POLYESTER RESINS
Jeremiah Mark Howald, Wallingford, Conn., and William Cockrum Dearing, Toledo, and Robert James Shrontz, Perrysburg, Ohio, assignors to American Cyanamid Company, Stamford, Conn., a corporation of Maine
No Drawing. Filed Nov. 26, 1963, Ser. No. 326,229
16 Claims. (Cl. 260—865)

This invention relates to a polyester resin composition comprising a polyester resin prepared by reacting an $\alpha,\beta$-ethylenically unsaturated dicarboxylic acid with a dihydric alcohol blended with a polymerizable compound containing a $CH_2=C<$ group and having a boiling point above 60° C. and as a stabilizer against premature gelation a boric acid ester of a phenol. Still further, this invention relates to unsaturated polyester resin molding compositions containing substantial proportions of fillers and as a stabilizer for the polymerizable materials, small but effective amounts of a boric acid ester of a phenol.

One of the objects of the present invention is to produce a stabilized polyester resin composition comprising a polyester resin prepared by esterifying an $\alpha,\beta$-ethylenically unsaturated dicarboxylic acid with a dihydric alcohol. a polymerizable vinyl or vinylidene compound having a boiling point of at least 60° C. by adding thereto a boric acid ester of a phenol. A further object of the present invention is to produce a stabilized filled unsaturated polyester resin molding composition containing as the stabilizer against premature gelation a small but effective amount of a boric acid ester of a phenol. These and other objects of the present invention will be discussed in greater detail hereinbelow.

The boric acid esters of phenols used in the present invention may be prepared by esterifying boric acid with an aryl hydroxide. An alternative method for the preparation of these borate esters is by a transesterification technique wherein the boric acid ester of a lower boiling alkanol is transesterified with the selected phenol in the appropriate mole ratios. These borate esters of phenols can be prepared by the processes set forth in the British Patent 864,840. The aryl hydroxide or phenol used to prepare the borate esters used in the practice of the process of the present invention, may be either unsubstituted aryl hydroxides such as hydroquinone or they may be any one of a plurality of alkyl or halo substituted aryl hydroxides. These phenols may be either mono hydroxides or poly hydroxides. The use of aryl hydroxide in the stabilization of these unsaturated polyester resin compositions is well known in the art as is represented by the U.S. Patent 2,457,657 and in greater detail in the U.S. Patent 2,632,751, each of which citations is incorporated herein by reference, as illustrating the types of aryl hydroxides which may be used to produce the borate esters used in the compositions of the present invention. These borate esters may be used either singly or in combination with one another, or may be used in combination with other stabilizers such as the aryl hydroxides themselves, or other known polyester resin composition stabilizers. The amount of the borate ester which may be used in the compositions of the present invention may be varied within the range of from about 0.02% to about 2% and preferably from about 0.05% to about 1% by weight based on the total weight of the polymerizable resin. If the aryl hydroxide compound is substituted, the substituents on the phenolic ring may be halo groups and more particularly, chloro, bromo and iodo groups, and/or alkyl groups such as, methyl, ethyl, propyl, isopropyl, n-butyl, isobutyl, tert.-butyl and the like. Among the phenols which may be used to prepare the borate esters used in the present invention are phenol per se, o-, m-, or p-cresol, hydroquinone, 2,5-ditertiarybutyl hydroquinone, 1-naphthol, 2-naphthol, 2,4-dichlorophenol, pentachlorophenol, p,p'-biphenol, tertiarybutyl-p-cresol, 2,6-di-tertiarybutyl-p-cresol, resorcinol, bisphenol A (isopropylidine bisphenol), and the like.

The polyester resin compositions used in the total composition of the present invention are well known in the art as is represented by the U.S. Patents 2,255,313; 2,443,735–41, inclusive, among others, all of which are incorporated herein by reference in order to avoid unnecessary redundancy of parts of the prior art which are already well known and recognized.

The polyester resin per se is prepared by reacting an $\alpha,\beta$-ethylenically unsaturated dicarboxylic acid with a polyhydric alcohol and preferably with dihydric alcohols such as the glycols. Illustrative of these $\alpha,\beta$-ethylenically unsaturated dicarboxylic acids are maleic, fumaric, itaconic, aconitic, and the like. Wherever available the anhydrides of these acids may be used and these acids and/or their anhydrides may be used either singly or in combination with one another. The polyhydric alcohols that may be used in preparing the polyester resins of the present invention are saturated aliphatic and/or cycloaliphatic alcohols such as ethylene glycol, propylene glycol, diethylene glycol, dipropylene glycol, propanediol-1,3; butanediol-1,4; and the like. These dihydric alcohols may be used either singly or in combination with one another or higher hydroxy containing aliphatic alcohols may be used as glycerol, pentaerythritol, dipentaerythritol, sorbitol, mannitol and the like. The use of the higher hydroxy containing alcohols should be restricted so as to have a preponderant amount of the dihydric alcohol present thereby avoiding any significant cross-linking during the polyester resin preparation. Ordinarily it is conventional to use with the $\alpha,\beta$-ethylenically unsaturated dicarboxylic acids other polycarboxylic acids which are free of non-benzenoid unsaturation such as phthalic, oxalic, malonic, succinic, glutaric, sebacic, adipic, pimelic, suberic, azelaic, tricarballylic, citric, tartaric, malic and the like. Wherever available the anhydrides of these acids may be used. These polycarboxylic acids, free of non-benzenoid unsaturation and/or their anhydrides may be used either singly or in combination with one another. Reference is made to the U.S. Patent 2,777,828 Day et al. which discloses in considerable detail the conventional amounts of the acids of both classes to be used in these polyester resins as well as the polyhydric alcohols and their amounts. In preparing these polyester resin compositions one generally uses an excess of the polyhydric alcohol amounting to about 10% over and beyond the amount of polyhydric alcohol stoichiometrically calculated to substantially esterify all of the carboxyl groups present in the reaction vessel. Ordinarily the esterification reaction is carried out until the acid number is less than about 55 and preferably between about 5 and 40.

The polyester resin composition is prepared by blending the polyester resin with a polymerizable monomer having a $CH_2=CH<$ group and having a boiling point of at least about 60° C. The Day et al. patent referred to hereinabove, spells out in significant detail the type of polymerizable monomer which may be advantageously used including the styrene compounds and the allyl compounds. Still further the Day et al. patent outlines the range of proportions which are conventionally used in blending the polyester resin with the polymerizable monomer.

When the polymerizable polyester composition of the present invention is to be used as a molding composition, it is desired to make use of the higher boiling monomers such as those having a boiling point in excess of about 250° C. at atmospheric pressure. This, of course, refers to polymerizable monomers of which a substantial plurality of species are available commercially such as diallyl phthalate, diallyl maleate, triallyl cyanurate, triallyl isocyanurate, ethylene glycol dimethacrylate and the like. When polyester resin molding compositions are to be prepared it is generally necessary to make use of one or more inert fillers which are well known in the art and are used commercially for this purpose. Included in the group of inert fillers are powdered calcium carbonate, glass fibers, asbestos fibers, clay and the like. The amount of filler can be varied over a fairly substantial range from 0% in a filler-free composition to about 60–85% by weight based on the total weight of the composition depending on the physical properties of the molding composition desired. Large amounts such as about 80% of filler by weight same basis should be utilized if a putty or rope-like molding composition is desired.

Additionally, as a matter of choice one may use coloring materials such as dyes and/or pigments but in this area the choice of coloring material and its amount is a matter of preference and is in no way an essential part of the composition. In the molding compositions it is frequently very desirable and advantageous to introduce the curing catalyst with or without a promoter for cure into the composition prior to its final packaging as a molding composition. The presence of the borate esters of the phenols will serve to advantage in the presence of the catalyst to maintain a stable composition, i.e., stable against premature gelation and/or cure during shipment and storage under the normal conditions experienced during said shipment and/or storage. These catalysts used in these polyester resin compositions are well known entities in the art and the amounts used are conventional. Illustrative of these catalytic materials are such peroxides as benzoyl peroxide, tertiarybutyl perbenzoate, tertiarybutyl hydroperoxide, ditertiarybutyl peroxide, cumene hydroperoxide and the like. In addition, other catalysts such as azobisaliphatic nitriles and the like can be used. In the molding compositions of the present invention it is sometimes desirable to make use of a mold lubricant such as a metallic soap and more specifically such materials as zinc stearate, zinc oleate, aluminum palmitate, and the like.

In order that the concept of the present invention may be more fully understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

*Example 1*

In a suitable reaction vessel equipped with thermometer, stirrer, reflux condenser and inlet and outlet inert gas tubes, there is introduced 2460 parts of dipropylene glycol, 1764 parts of maleic anhydride, 3 parts of hydroquinone, with constant stirring and under an atmosphere of carbon dioxide. The reactants are heated for about 2¼ hours at 230° C. at which time the acid number is about 40. 62.8 parts of the polyester resin thus prepared, 1.57 parts of benzoyl peroxide dissolved in 15.7 parts of diallyl phthalate, 2 parts of aluminum palmitate, varying amounts of the same or different stabilizers and 300 parts of ground limestone filler are mixed together to produce uniform putty-like compositions in a sigma blade mixer. Small balls of the putty are prepared weighing approximately 40 grams and these putty balls are placed in an oven at 50° C. with forced air circulation. The samples are considered to be gelled and no longer suitable for molding when a small knife blade cannot be pushed through the center of the balls. The results of a plurality of these tests including a control (no stabilizer) and two other materials not included within the scope of the present invention, are tested. These results are set forth hereinbelow in Table I.

TABLE I

| Stabilizer | Stabilizer Concentration Percent of Polymerizable Binder | Stability at 50° C., Hours |
|---|---|---|
| None (Control) | 0 | 8 |
| Tri-n-butyl borate (Control) | 0.15 | 8 |
| 2,6-di-t-butyl-p-cresol (Control) | 0.15 | 48 |
| Di(di-n-butyl borate) ester of hydroquinone | 0.3 | 15 |
|  | 0.5 | 22 |
|  | 1.0 | 28 |
| Di(di-n-butyl borate) ester of P,P′-Biphenol | 0.1 | 29 |
|  | 0.2 | 48 |
| Tri-cresyl borate | 0.15 | 24 |
| 2,6-di-t-butyl phenyl-di-n-butyl borate | 0.15 | 35 |
| 2,6-di-t-butyl-p-cresyl-di-n-butyl borate | 0.15 | 64 |

*Example 2*

Example 1 is repeated in substantially all details except that the stabilizer in each instance is 2,6-di-t-butyl-4-cresyl-di-n-butyl borate. The concentration of the stabilizer was varied. The results of this test are set forth hereinbelow in Table II.

TABLE II

[2,6-di-t-butyl-4-cresyl-di-n-butyl borate]

| Concentration Percent of Polymerizable Binder | 50° C. Stability, Hours | Barcol Hardness of Molding Cured 30 sec. at 310° F. |
|---|---|---|
| 0.1 | 64 | 76 |
| 0.2 | 64 | 76 |
| 0.4 | 88 | 73 |
| 0.6 | 88 | 72 |

We claim:

1. A polymerizable polyester resin composition comprising a mixture of
   (1) a polyester resin prepared by reacting an $\alpha,\beta$-ethylenically unsaturated dicarboxylic acid and a dihydric alcohol,
   (2) a polymerizable monomer containing a $CH_2{=}C{<}$ group and having a boiling point of at least 60° C., and
   (3) as a stabilizer against premature gelation for (1) and (2), a boric acid ester of a phenol.

2. A polymerizable polyester resin composition comprising a mixture of
   (1) a polyester resin prepared by reacting an $\alpha,\beta$-ethylenically unsaturated dicarboxylic acid and a dihydric alcohol,
   (2) a polymerizable allyl compound, and
   (3) as a stabilizer against premature gelation for (1) and (2), a boric acid ester of a phenol.

3. A polymerizable polyester resin composition comprising a mixture of
   (1) a polyester resin prepared by reacting an $\alpha,\beta$-ethylenically unsaturated dicarboxylic acid and a dihydric alcohol,
   (2) diallyl phthalate, and
   (3) as a stabilizer against premature gelation for (1) and (2), a boric acid ester of a phenol.

4. A polymerizable polyester resin composition comprising a mixture of
   (1) a polyester resin prepared by reacting an $\alpha,\beta$-ethylenically unsaturated dicarboxylic acid and a dihydric alcohol,
   (2) a polymerizable allyl compound, and
   (3) di(di-n-butyl borate)ester of hydroquinone.

5. A polymerizable polyester resin composition comprising a mixture of
   (1) a polyester resin prepared by reacting an $\alpha,\beta$-ethylenically unsaturated dicarboxylic acid and a dihydric alcohol,
   (2) a polymerizable allyl compound, and
   (3) di(di-n-butyl borate)ester of p,p′-biphenol.

6. A polymerizable polyester resin composition comprising a mixture of
   (1) a polyester resin prepared by reacting an α,β-ethylenically unsaturated dicarboxylic acid and a dihydric alcohol,
   (2) a polymerizable allyl compound, and
   (3) tri-cresyl borate.

7. A polymerizable polyester resin composition comprising a mixture of
   (1) a polyester resin prepared by reacting an α,β-ethylenically unsaturated dicarboxylic acid and a dihydric alcohol,
   (2) a polymerizable allyl compound, and
   (3) 2,6-di-t-butyl phenyl-di-n-butyl borate.

8. A polymerizable polyester resin composition comprising a mixture of
   (1) a polyester resin prepared by reacting an α,β-ethylenically unsaturated dicarboxylic acid and a dihydric alcohol,
   (2) a polymerizable allyl compound, and
   (3) 2,6-di-t-butyl-p-cresyl-di-n-butyl borate.

9. A polymerizable polyester resin composition comprising a mixture of
   (1) a polyester resin prepared by reacting an α,β-ethylenically unsaturated dicarboxylic acid and a dihydric alcohol,
   (2) diallyl phthalate, and
   (3) di(di-n-butyl borate)ester of hydroquinone.

10. A polymerizable polyester resin composition comprising a mixture of
    (1) a polyester resin prepared by reacting an α,β-ethylenically unsaturated dicarboxylic acid and a dihydric alcohol,
    (2) diallyl phthalate, and
    (3) di(di-n-butyl borate)ester of p,p'-biphenol.

11. A polymerizable polyester resin composition comprising a mixture of
    (1) a polyester resin prepared by reacting an α,β-ethylenically unsaturated dicarboxylic acid and a dihydric alcohol,
    (2) diallyl phthalate, and
    (3) tri-cresyl borate.

12. A polymerizable polyester resin composition comprising a mixture of
    (1) a polyester resin prepared by reacting an α,β-ethylenically unsaturated dicarboxylic acid and a dihydric alcohol,
    (2) diallyl phthalate, and
    (3) 2,6-di-t-butyl phenyl-di-n-butyl borate.

13. A polymerizable polyester resin composition comprising a mixture of
    (1) a polyester resin prepared by reacting an α,β-ethylenically unsaturated dicarboxylic acid and a dihydric alcohol,
    (2) diallyl phthalate, and
    (3) 2,6-di-t-butyl-p-cresyl-di-n-butyl borate.

14. A polymerizable polyester resin composition comprising a mixture of
    (1) A polyester resin prepared by reacting an α,β-ethylenically unsaturated dicarboxylic acid and a dihydric alcohol,
    (2) a polymerizable allyl compound,
    (3) a stabilizer against premature gelation for (1) and (2), a boric acid ester of a phenol, and
    (4) a polymerization catalyst for (1) and (2).

15. A polymerizable polyester resin composition comprising a mixture of
    (1) a polyester resin prepared by reacting an α,β-ethylenically unsaturated dicarboxylic acid and a dihydric alcohol,
    (2) diallyl phthalate,
    (3) as a stabilizer against premature gelation for (1) and (2), a boric acid ester of a phenol, and
    (4) a polymerization catalyst for (1) and (2).

16. A polymerizable polyester resin composition comprising a mixture of
    (1) a polyester resin prepared by reacting an α,β-ethylenically unsaturated dicarboxylic acid and a dihydric alcohol,
    (2) diallyl phthalate,
    (3) 2,6-di-t-butyl-p-cresyl-di-n-butyl borate, and
    (4) a polymerization catalyst for (1) and (2).

References Cited by the Examiner
UNITED STATES PATENTS

| | | | |
|---|---|---|---|
| 3,102,902 | 9/1963 | Washburn et al. | 260—462 |
| 3,197,526 | 7/1965 | Howald | 260—866 |

FOREIGN PATENTS 864,840  4/1961  Great Britain.

SAMUEL H. BLECH, *Primary Examiner.*

MURRAY TILLMAN, *Examiner.*

J. T. GOOLKASIAN, *Assistant Examiner.*